US010618422B2

(12) United States Patent
Kozuka (10) Patent No.: US 10,618,422 B2
(45) Date of Patent: Apr. 14, 2020

(54) FUEL CELL VEHICLE

(71) Applicant: TOYOTA JIDOSHA KABUSHIKI KAISHA, Toyota-shi, Aichi-ken (JP)

(72) Inventor: Tomoyuki Kozuka, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 113 days.

(21) Appl. No.: 15/866,650

(22) Filed: Jan. 10, 2018

(65) Prior Publication Data

US 2018/0201155 A1    Jul. 19, 2018

(30) Foreign Application Priority Data

Jan. 19, 2017    (JP) ................................. 2017-007764

(51) Int. Cl.
*H01M 8/24*    (2016.01)
*H01M 8/04*    (2016.01)
(Continued)

(52) U.S. Cl.
CPC ............ *B60L 11/1896* (2013.01); *B60K 1/04* (2013.01); *B60L 3/0007* (2013.01); *B60L 3/0015* (2013.01); *B60L 3/0053* (2013.01); *B60L 50/71* (2019.02); *B60L 50/72* (2019.02); *H01M 8/04111* (2013.01); *H01M 8/22* (2013.01); *H01M 8/2475* (2013.01); *B60K 2001/0411* (2013.01); *B60Y 2306/01* (2013.01); *H01M 2008/1095* (2013.01); *H01M 2250/20* (2013.01); *Y02T 10/7005* (2013.01); *Y02T 90/32* (2013.01)

(58) Field of Classification Search
CPC .......... H01M 8/02–04992; H01M 8/24; B60L 50/50–72; B60L 3/00–0015; B60L 3/0053; B60K 1/04
See application file for complete search history.

(56) References Cited

U.S. PATENT DOCUMENTS

2005/0224265 A1*  10/2005  Mizuno .................... B60K 1/02
                                                         429/413
2012/0006606 A1*   1/2012  Masaki .................... B60K 1/04
                                                         180/65.31
(Continued)

FOREIGN PATENT DOCUMENTS

JP         2014-76716         5/2014
JP         2014-83875         5/2014
(Continued)

*Primary Examiner* — Jonathan G Leong
*Assistant Examiner* — Jacob Buchanan
(74) *Attorney, Agent, or Firm* — Finnegan, Henderson, Farabow, Garrett & Dunner, LLP (57) ABSTRACT

A fuel cell vehicle includes a fuel cell module accommodated in a fuel cell accommodation space disposed in a front portion of the vehicle, a hydrogen circulation flow path configured to recirculate anode off-gas that is discharged from a fuel cell constituting the fuel cell module to the fuel cell, and a hydrogen pump provided in the hydrogen circulation flow path and fixed to a lower portion of the fuel cell module. The hydrogen pump is fixed to the fuel cell module via a bracket and the deformation strength of the bracket is set to be lower than a load input from a wall portion behind the fuel cell accommodation space at the time of collision of the vehicle.

6 Claims, 6 Drawing Sheets

(51) Int. Cl.
  *B60K 1/04*     (2019.01)
  *B60L 3/00*     (2019.01)
  *B60L 11/18*    (2006.01)
  *H01M 8/2475*   (2016.01)
  *H01M 8/04111*  (2016.01)
  *H01M 8/22*     (2006.01)
  *B60L 50/71*    (2019.01)
  *B60L 50/72*    (2019.01)
  *H01M 8/1018*   (2016.01)

(56) References Cited

U.S. PATENT DOCUMENTS

| | | | |
|---|---|---|---|
| 2014/0110185 A1 | 4/2014 | Naito et al. | |
| 2015/0244006 A1* | 8/2015 | Yoshitomi | H01M 8/2475 429/446 |
| 2015/0251560 A1* | 9/2015 | Ishikawa | B62D 21/15 180/232 |
| 2016/0297290 A1* | 10/2016 | Murata | B60K 1/04 |
| 2017/0096067 A1* | 4/2017 | Murata | B60K 1/04 |
| 2017/0096172 A1* | 4/2017 | Nagaosa | H01M 8/04201 |
| 2017/0101031 A1* | 4/2017 | Ohashi | B60L 50/71 |
| 2018/0290560 A1* | 10/2018 | Takeyama | H01M 8/04089 |

FOREIGN PATENT DOCUMENTS

| | | | |
|---|---|---|---|
| WO | WO-2015146267 A1 * | 10/2015 | B60K 1/04 |
| WO | WO-2015186438 A1 * | 12/2015 | B62D 27/02 |

* cited by examiner

| FRICTION COEFFICIENT WITH RESPECT TO OTHER COMPONENT | INSTALLATION ANGLE ($\theta$) |
|---|---|
| 0.3 | 21.7 deg |
| 0.4 | 26.8 deg |
| 0.5 | 31.6 deg |

FUEL CELL VEHICLE

INCORPORATION BY REFERENCE

The disclosure of Japanese Patent Application No. 2017-007764 filed on Jan. 19, 2017 including the specification, drawings and abstract is incorporated herein by reference in its entirety.

BACKGROUND

1. Technical Field

The present disclosure relates to a fuel cell vehicle.

2. Description of Related Art

As a fuel cell vehicle, generally, a fuel cell vehicle in which a fuel cell and a hydrogen pump are installed in a fuel cell accommodation space disposed in a front portion of the fuel cell vehicle is used in many cases (for example, refer to Japanese Unexamined Patent Application Publication No. 2014-083875 (JP 2014-083875 A)). The hydrogen pump is attached to a stack frame (frame that constitutes fuel cell stack) by using an iron bracket or the like.

SUMMARY

However, when head-on collision of the vehicle having a structure in which the hydrogen pump is disposed below the fuel cell occurs, a wall portion (in present specification, also referred to as "dash panel") behind the fuel cell accommodation space is moved toward the hydrogen pump and the wall portion (dash panel) retreats in reply to a reaction force from the hydrogen pump, which may result in a problem that a load is applied to the vehicle.

Hereinafter, the details of the above description will be described. That is, since produced water circulates in the hydrogen pump of the fuel cell vehicle, it is needed to secure a water discharging performance in consideration of a freezing problem and a noise and vibration (NV) problem. Therefore, a pipe extending from the hydrogen pump is provided to extend perpendicularly as much as possible to the hydrogen pump and does not have a U-like shape. In order to realize such a structure, it is needed to install the hydrogen pump such that the hydrogen pump overhangs with respect to the stack frame (frame that constitutes fuel cell stack) in a dash panel direction (direction toward dash panel) by using the bracket or the like (refer to FIG. 3). However, the hydrogen pump overhanging with respect to the stack frame results in an adverse effect of an increase in dash panel retreating amount (amount by which dash panel retreats at time of collision of vehicle). In consideration of the above-described circumstances, a configuration in which the bracket is deformed and the hydrogen pump moves toward a vehicle front side when collision of the vehicle occurs has been applied as a method that satisfies the necessity of overhanging the hydrogen pump and the necessity of suppressing the increase in dash panel retreating amount. The point is that, in order to suppress a toe board retreating amount (amount by which plate portion close to feet of occupant retreats toward occupant side) of the dash panel at the time of collision of the vehicle, the hydrogen pump is configured to move in a direction to a side opposite to the dash panel side with a load at the time of collision such that the toe board retreating amount falls within an allowable range. However, even in this case, the amount by which the hydrogen pump moves may be insufficient and the dash panel retreating amount being insufficiently suppressed may result in a load being applied to the inside of the vehicle.

Therefore, the present disclosure provides a fuel cell vehicle with which it is able to efficiently suppress a load being applied to the inside of the vehicle at the time of collision of the vehicle.

An aspect relates to a fuel cell vehicle including a fuel cell module, a hydrogen circulation flow path, and a hydrogen pump. The fuel cell module is accommodated in a fuel cell accommodation space disposed in a front portion of the vehicle. The hydrogen circulation flow path is configured to recirculate anode off-gas that is discharged from a fuel cell constituting the fuel cell module to the fuel cell. The hydrogen pump is provided in the hydrogen circulation flow path and is fixed to a lower portion of the fuel cell module. The hydrogen pump is fixed to the fuel cell module via a bracket and the deformation strength of the bracket is set to be lower than a load input from a wall portion behind the fuel cell accommodation space at the time of collision of the vehicle.

In the fuel cell vehicle according to the aspect, since the bracket is deformed when input is applied to the bracket from the wall portion at the time of head-on collision of the vehicle, the hydrogen pump is not hindered from moving. When the hydrogen pump moves to some extent, a reaction force to the wall portion is reduced and thus a load being applied to the inside of the vehicle is efficiently suppressed.

The fuel cell vehicle according to the aspect may further include an air compressor disposed in front of the hydrogen pump. The hydrogen pump may be disposed to be inclined with respect to the air compressor.

In the fuel cell vehicle according to the aspect, the friction coefficient between the hydrogen pump and the air compressor may be set to be lower than the friction coefficient between the hydrogen pump and the wall portion.

In the fuel cell vehicle according to the aspect, the hydrogen pump may be inclined upwards and toward the wall portion.

In the fuel cell vehicle according to the aspect, the bracket may include a first bracket in the vicinity of the wall portion and a second bracket that is more further from the wall portion than the first bracket. The deformation strength of the first bracket may be lower than the deformation strength of the second bracket.

In the fuel cell vehicle according to the aspect, the bracket may include a first bracket in the vicinity of the wall portion, a second bracket that is more further from the wall portion than the first bracket, and a third bracket in the vicinity of the air compressor.

According to the aspect, it is possible to efficiently suppress a load being applied to the inside of a vehicle at the time of collision of the vehicle.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 6 is a plan view illustrating a front portion of the fuel cell vehicle, a fuel cell installed in the front portion, and the like.

DETAILED DESCRIPTION OF EMBODIMENTS

A preferable embodiment will be described with reference to attached drawings. Note that, components given the same reference numeral in the drawings have the same configuration or have similar configurations.

Figure 7:
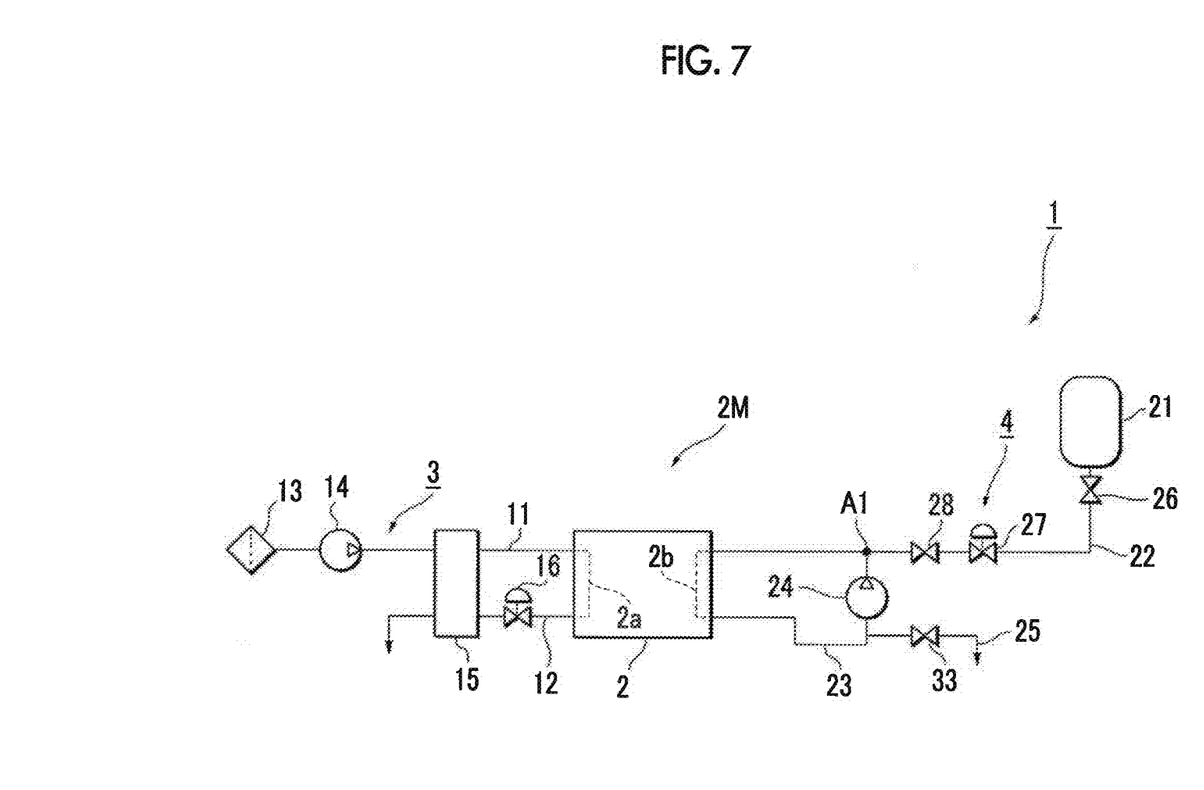
FIG. 7 is a view schematically illustrating a configuration of a fuel cell system.

A fuel cell system 1 is provided with a fuel cell 2, an oxidation gas pipe system 3, and a fuel gas pipe system 4 (refer to FIG. 7). The fuel cell system 1 can be installed in a vehicle and it is a matter of course that the fuel cell system 1 can also be applied to various moving objects (for example, ship, airplane, or robot) and a stationary type power source instead of the vehicle.

The fuel cell 2 has a stacked structure in which a plurality of unit cells is stacked. Each unit cell is a solid polymer electrolyte type unit cell and includes an air electrode, a fuel electrode, and a pair of separators. The air electrode is on one surface of an electrolyte film, the fuel electrode is on the other surface of the electrolyte film, and the air electrode and the fuel electrode are interposed between the separators. Generally, a fluorine-based film is used as the electrolyte film. Oxidation gas is supplied to an oxidation gas flow path 2a of one of the separators and fuel gas is supplied to a fuel gas flow path 2b of the other separator (refer to FIG. 7). The fuel cell 2 generates electric power due to electrochemical reaction between the supplied oxidation gas and fuel gas. In addition, due to the electrochemical reaction, the fuel cell 2 generates heat, and water is generated on the air electrode side.

The oxidation gas pipe system 3 includes a supply path 11 and a discharge path 12 (refer to FIG. 7). An air compressor 14 is provided in the supply path 11, takes in outside air as the oxidation gas via an air cleaner 13, and press-feeds the outside air to the oxidation gas flow path 2a of the fuel cell 2. A humidifier 15 performs water exchange between the press-fed oxidation gas and oxidation off-gas such that the press-fed oxidation gas is appropriately humidified. The oxidation off-gas is discharged to the discharge path 12 from the oxidation gas flow path 2a and is discharged to the atmosphere outside the system as exhaust gas after passing through an air pressure adjusting valve 16, the humidifier 15, and a muffler (not shown) at the end.

The fuel gas pipe system 4 supplies hydrogen gas as the fuel gas to the fuel cell 2 (refer to FIG. 7). The fuel gas pipe system 4 includes a hydrogen supply source 21, a supply path 22, a hydrogen circulation flow path 23, a hydrogen pump 24 and a purge path 25. The hydrogen gas flows to the supply path 22 from the hydrogen supply source 21 when a master valve 26 is opened and is supplied to the fuel gas flow path 2b through a regulator 27 and a shutoff valve 28. Thereafter, the hydrogen gas is discharged from the fuel gas flow path 2b to the hydrogen circulation flow path 23 as hydrogen off-gas (anode off-gas). The hydrogen off-gas is press-fed by the hydrogen pump 24 to a confluence point A1 between the hydrogen circulation flow path 23 and the supply path 22 and is supplied to the fuel gas flow path 2b again after joining the hydrogen gas. A portion of the hydrogen off-gas is discharged from the hydrogen circulation flow path 23 to the purge path 25 with a purge valve 33 being appropriately opened and is discharged to the outside through a hydrogen dilution device (not shown).

Figure 6:
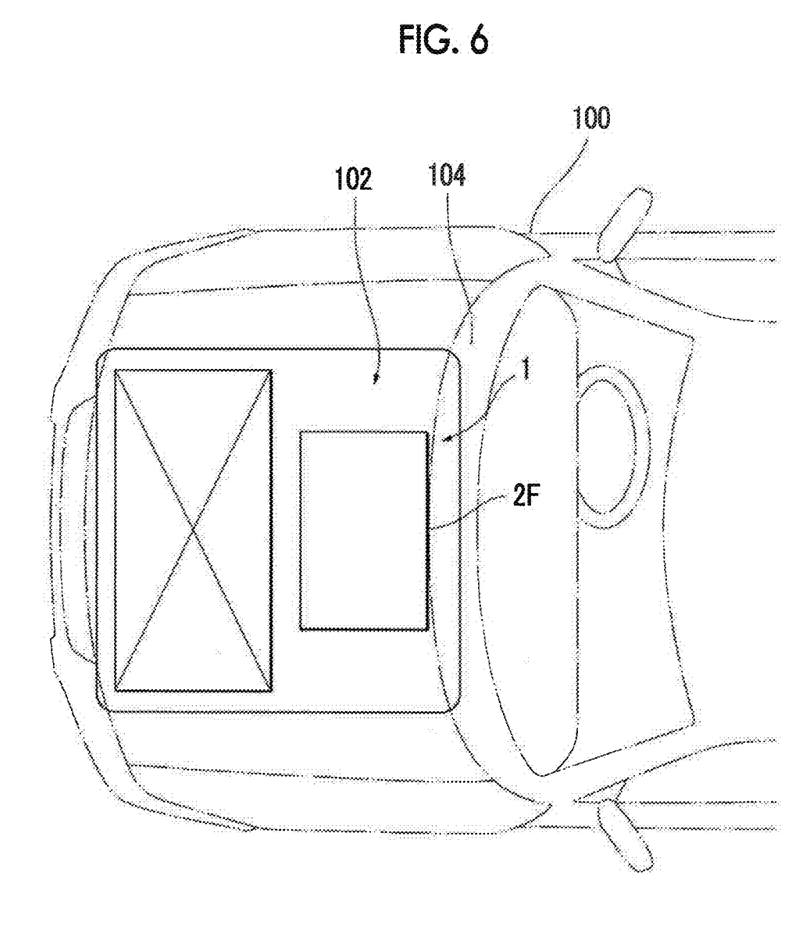

A fuel cell module 2M is disposed in a fuel cell accommodation space 102 in a fuel cell vehicle 100 (refer to FIG. 6). In the fuel cell vehicle 100 in the embodiment, the hydrogen pump 24 is positioned below the fuel cell module 2M and is installed by being attached via a bracket 80 such that the hydrogen pump 24 overhangs with respect to a stack frame 2F of the fuel cell module 2M in a dash panel direction (direction toward dash panel 104) (refer to FIG. 3 or like).

Figure 3:
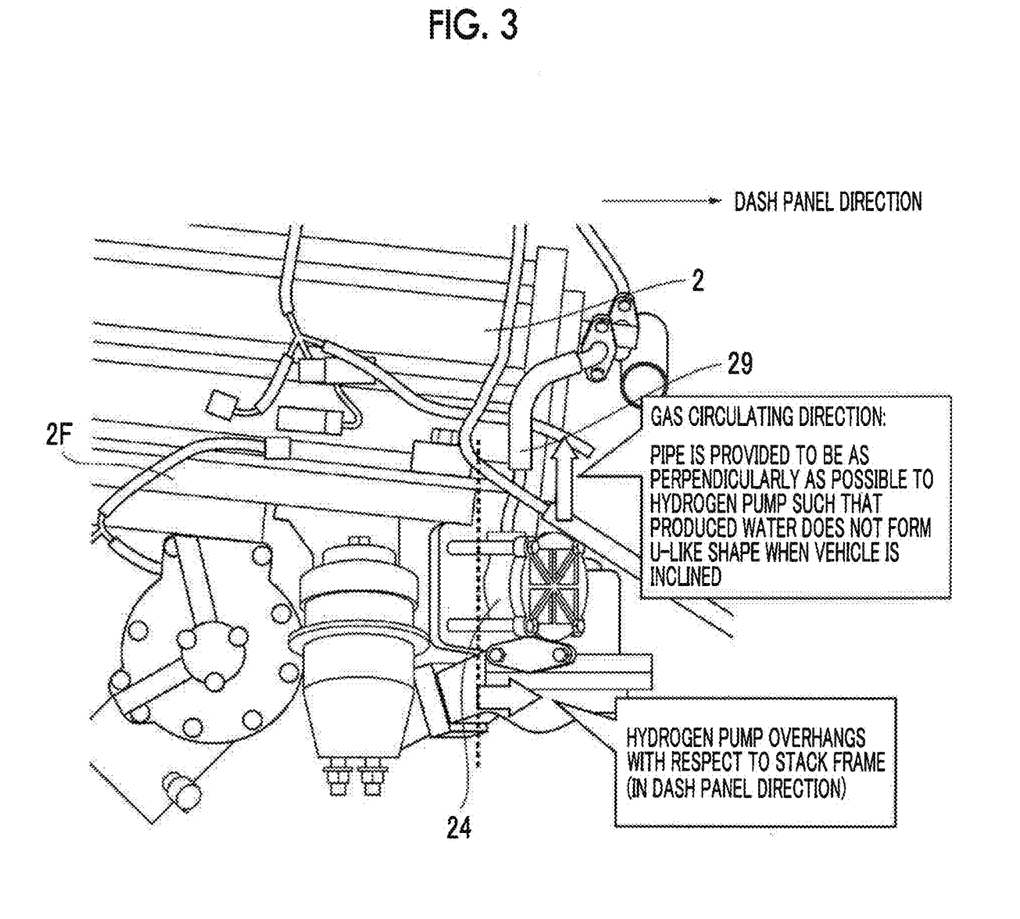
FIG. 3 is a view as seen from a vehicle lateral side for describing a preferable installation position of the hydrogen pump in consideration of water discharging properties.

A direction in which gas circulates behind the hydrogen pump 24 in the fuel cell module 2M is as represented by an arrow (refer to FIG. 3). That is, a pipe from the hydrogen pump 24 is preferably provided to be as perpendicular as possible to the hydrogen pump 24 such that produced water does not form a U-like shape when the fuel cell vehicle 100 is inclined.

The dash panel 104 is provided behind the fuel cell accommodation space 102 and constitutes a wall portion that separates the fuel cell accommodation space 102 and a vehicle cabin from each other.

As the bracket 80, a bracket of which the deformation strength is set to be smaller than a load that is input from the dash panel 104 at the time of collision of the fuel cell vehicle 100 is adopted. That is, the bracket 80 has a strength to an extent of being deformed due to a load received from the dash panel 104 at the time of collision of the vehicle (refer to FIG. 1 or like).

Figure 1:
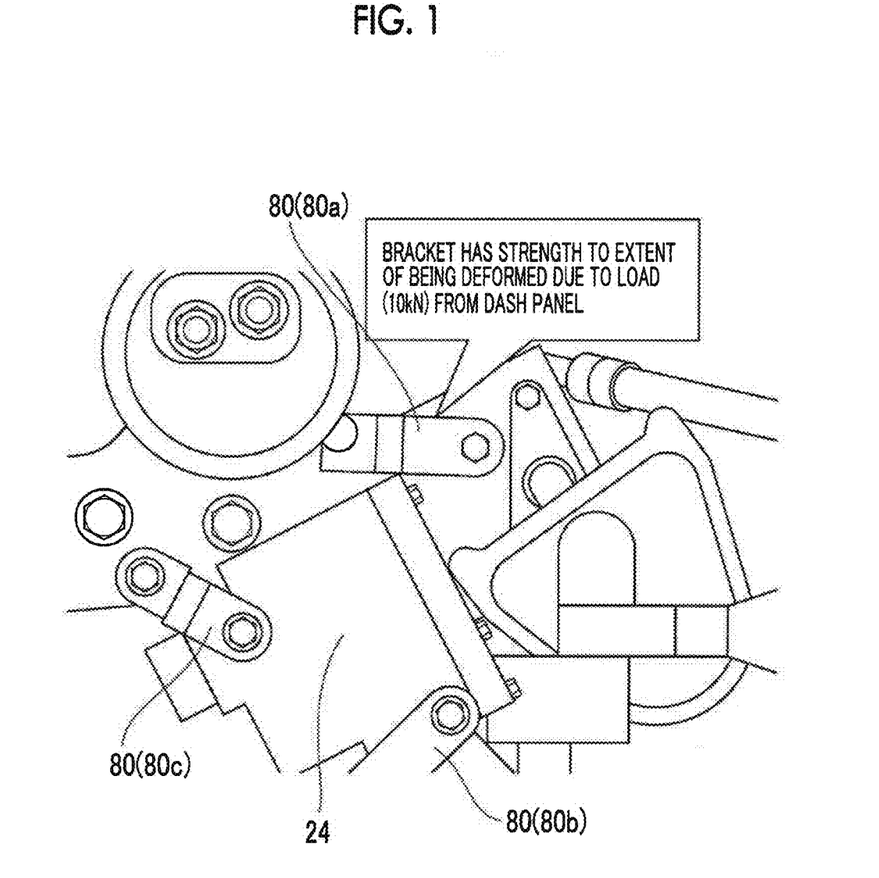
FIG. 1 is a view illustrating an example of how a hydrogen pump is attached.
Figure 2:
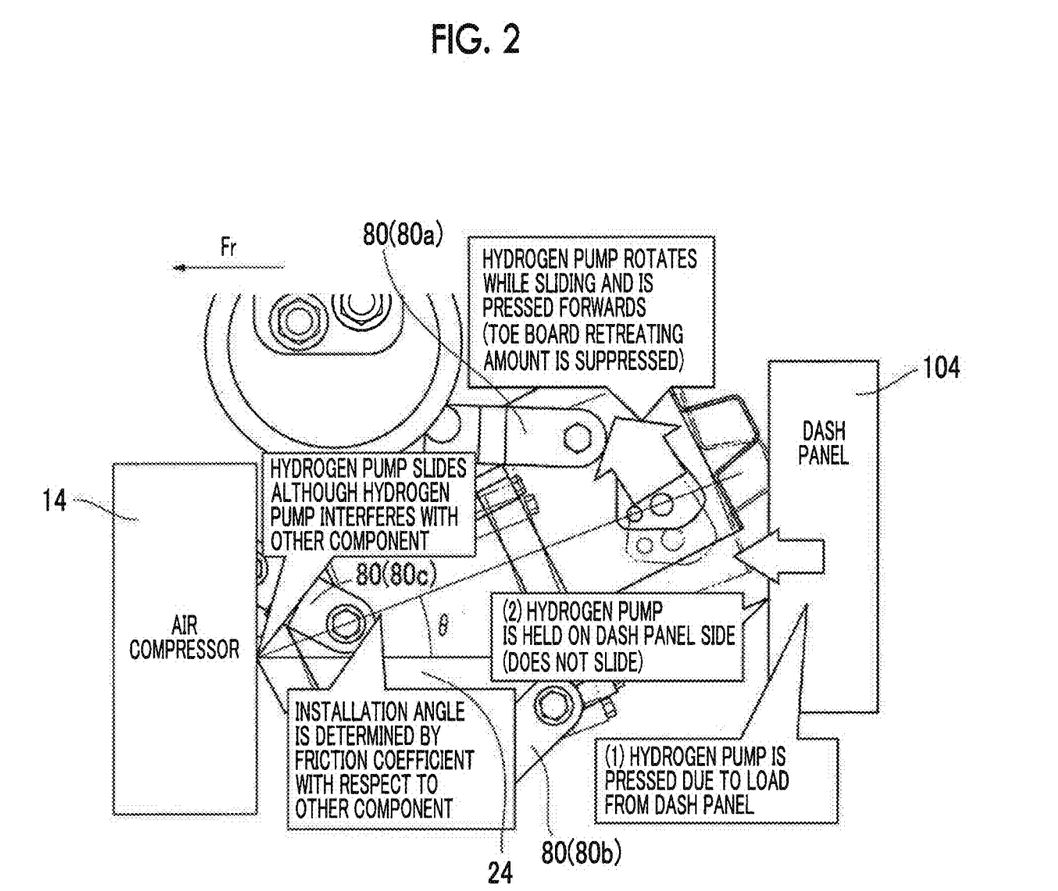
FIG. 2 is a view fix describing the behavior of the hydrogen pump at the time of head-on collision of a fuel cell vehicle.

The bracket 80 in the embodiment includes a first bracket 80a that is disposed in the vicinity (closest position) of the dash panel 104, a second bracket 80b that is more further from the dash panel 104 than the first bracket 80a and is disposed in a lower side in FIGS. 1 and 2, and a third bracket 80c that is disposed in the vicinity (closest position) of the air compressor 14 (refer to FIGS. 1 and 2). The deformation strength of the first bracket 80a is lower than the deformation strength of the second bracket 80b. Therefore, at the time of collision of the fuel cell vehicle 100, the hydrogen pump 24 can move by rotating with the second bracket 80b as an axis.

Figure 4:
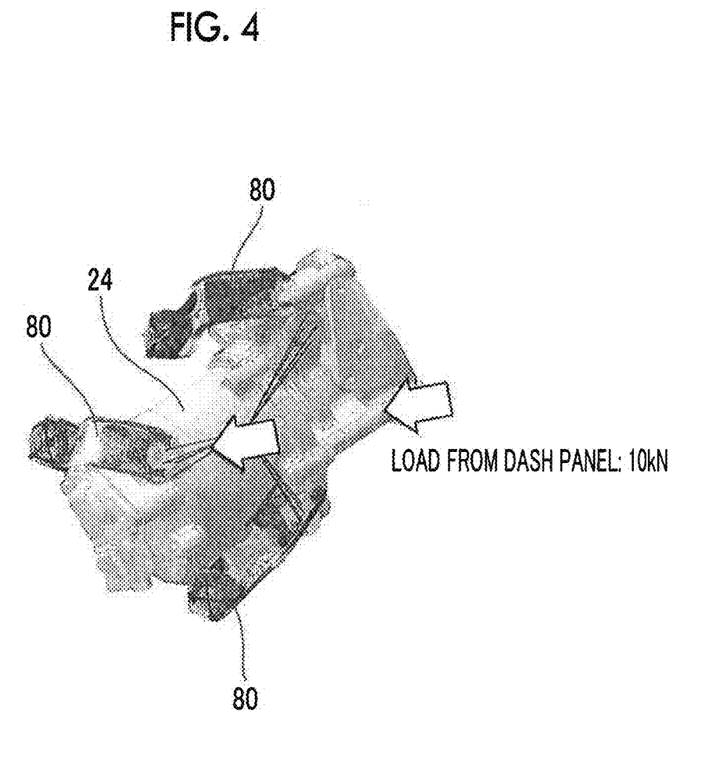
FIG. 4 is a view illustrating the result of a CAE analysis on deformation of a bracket.

For reference, an example of the result of a CAE analysis on deformation of the bracket 80 that is elastically deformed by receiving a load is provided (refer to FIG. 4). The provided example shows the result of an analysis pertaining to a case where the bracket 80 that has a thickness of 2.0 mm and a flange height of 8 mm and is formed of a material having a tensile strength of 270 MPa or more (or tensile strength of 440 MPa or more) is elastically deformed by receiving a load (10 kN) from the dash panel 104.

In addition, in the fuel cell vehicle 100 in the embodiment, the air compressor 14, which is an example of components other than the hydrogen pump (in present specification and attached drawings, may be referred to as other components), is disposed in front of the hydrogen pump 24. The hydrogen pump 24 is disposed to be inclined upwards and toward the dash panel 104 with respect to the air compressor 14 (in other words, hydrogen pump 24 is disposed to be inclined downwards in direction toward vehicle front side that is represented by reference symbol "Fr" in FIG. 2) (refer to FIG. 2). Therefore, at the time of collision of the vehicle, the hydrogen pump 24 collides with the air compressor 14 at a position offset from the center, receives an external force that generates a moment, rotates while sliding relative to the air compressor 14, and is pressed forwards. As a result, the hydrogen pump 24 moves in a direction to a side opposite to the dash panel 104 side. Therefore, the toe board retreating amount of the dash panel 104 at the time of collision of the vehicle is suppressed.

Furthermore, in the fuel cell vehicle 100 in the embodiment, the friction coefficient between the hydrogen pump 24 and the air compressor 14 is set to be lower than the friction coefficient between the hydrogen pump 24 and the dash panel (wall portion) 104. Therefore, at the time of collision of the vehicle, the hydrogen pump 24 slides relative to the air compressor 14. That is, although the hydrogen pump 24 interferes with the air compressor 14 at the time of collision of the vehicle, the hydrogen pump 24 rotates while sliding relative to the air compressor 14 as described above at the time of collision of the vehicle because the hydrogen pump 24 is disposed to be inclined.

Figure 5:
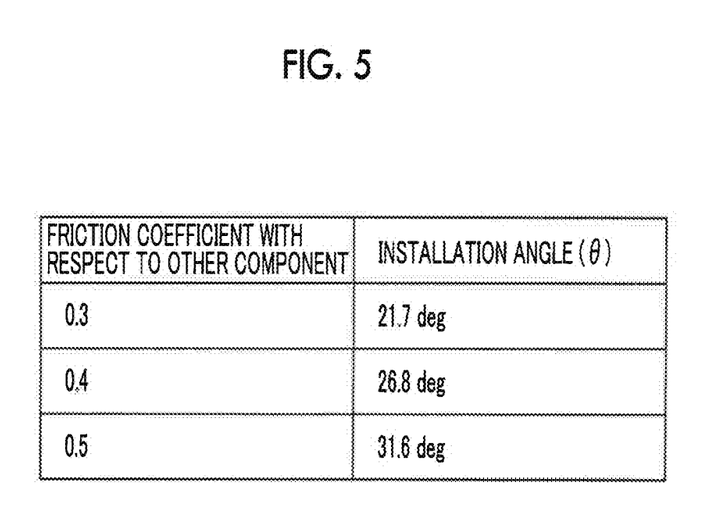
FIG. 5 is a table showing a relationship between the friction coefficient with respect to other components and the installation angle.

Examples of the friction coefficient with respect to the air compressor 14 and the installation angle θ of the hydrogen pump 24 are shown (refer to FIG. 5). The angle of the hydrogen pump 24 with respect to the air compressor 14 may be determined in accordance with the friction coefficient with respect to the air compressor 14 (for example, installation angle θ is 26.8 degrees when friction coefficient is 0.4μ).

Next, the behavior of the hydrogen pump 24 at the time of head-on collision of the fuel cell vehicle 100 will be described (refer to FIG. 2 or like). At the time of collision, (1) the hydrogen pump 24 is pressed forwards due to a load received from the dash panel 104. At this time, (2) the hydrogen pump 24 is held by the dash panel 104 without sliding. When the hydrogen pump 24 receives the load, the bracket 80 is deformed and the hydrogen pump 24 is not hindered from moving to the vehicle front side. In the middle of a movement of the air compressor 14 to the vehicle front side, the hydrogen pump 24 interferes with the air compressor 14, rotates while sliding, and is pressed forwards. Since the hydrogen pump 24 rotates while sliding relative to the air compressor 14 as described above at this time, the movement amount of the hydrogen pump 24 to a front side is likely to be secured. As a result, the toe board retreating amount of the dash panel 104 at the time of collision of the vehicle is suppressed and a load being applied to the inside of the vehicle is efficiently suppressed.

The above-described embodiment is for facilitating the understanding of the aspect and is not to be interpreted to limit the aspect. Elements in the embodiment and the disposition, material, condition, shape, size, and the like of each of the elements are not limited to those described above and can be appropriately modified. In addition, components described in different embodiments can be partially substituted with each other or can be combined with each other.

The aspect is suitable for being applied to a fuel cell vehicle provided with a fuel cell module, a hydrogen circulation flow path, a hydrogen pump, and the like.

What is claimed is:

1. A fuel cell vehicle comprising:
   a fuel cell module accommodated in a fuel cell accommodation space disposed in a front portion of the vehicle;
   a wall portion disposed behind the fuel cell accommodation space, the wall portion separating the fuel cell accommodation space from a cabin of the vehicle; and
   a hydrogen pump provided in a hydrogen circulation flow path configured to recirculate anode off-gas that is discharged from a fuel cell of the fuel cell module back to the fuel cell,
   wherein the hydrogen pump is fixed to a lower portion of the fuel cell module in a position adjacent the wall portion via a bracket, and
   wherein a deformation strength of the bracket is set to be lower than a load input received by the hydrogen pump from the wall portion at a time of collision of the vehicle.

2. The fuel cell vehicle according to claim 1 further comprising an air compressor disposed in front of the hydrogen pump,
   wherein the hydrogen pump is disposed to be inclined with respect to the air compressor.

3. The fuel cell vehicle according to claim 2, wherein a friction coefficient between the hydrogen pump and the air compressor is set to be lower than a friction coefficient between the hydrogen pump and the wall portion.

4. The fuel cell vehicle according to claim 2, wherein the hydrogen pump is inclined upwards and toward the wall portion.

5. The fuel cell vehicle according to claim 2, wherein the bracket includes a first bracket in a vicinity of the wall portion, a second bracket that is further from the wall portion than the first bracket, and a third bracket in a vicinity of the air compressor.

6. The fuel cell vehicle according to claim 1, wherein:
   the bracket includes a first bracket in a vicinity of the wall portion and a second bracket that is further from the wall portion than the first bracket; and
   a deformation strength of the first bracket is lower than a deformation strength of the second bracket.

* * * * *